United States Patent
Chung et al.

(10) Patent No.: US 8,363,711 B2
(45) Date of Patent: Jan. 29, 2013

(54) RECEIVE APPARATUS AND METHOD IN A MOBILE COMMUNICATION SYSTEM

(75) Inventors: Soo-Jung Chung, Seongnam-si (KR); Won-Kyu Suk, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 491 days.

(21) Appl. No.: 12/640,393

(22) Filed: Dec. 17, 2009

(65) Prior Publication Data
US 2010/0158095 A1 Jun. 24, 2010

(30) Foreign Application Priority Data
Dec. 24, 2008 (KR) .................. 10-2008-0133419

(51) Int. Cl.
*H03K 5/159* (2006.01)
*H04B 1/10* (2006.01)
(52) U.S. Cl. ........................ 375/232; 375/350
(58) Field of Classification Search .............. 375/229, 375/232, 350; 708/322, 323
See application file for complete search history.

(56) References Cited

U.S. PATENT DOCUMENTS

| | | | |
|---|---|---|---|
| 7,433,908 B2 * | 10/2008 | Tanrikulu et al. | 708/322 |
| 2002/0012391 A1 * | 1/2002 | Ahn | 375/232 |
| 2003/0021359 A1 * | 1/2003 | He | 375/232 |
| 2005/0286625 A1 * | 12/2005 | Jung | 375/232 |

FOREIGN PATENT DOCUMENTS

KR 10-2009-0131794 A 12/2009

* cited by examiner

*Primary Examiner* — Betsy Deppe
(74) *Attorney, Agent, or Firm* — Jefferson IP Law, LLP

(57) ABSTRACT

An apparatus and method for partially updating a tap coefficient and for reducing a hardware size are provided. The apparatus includes a channel estimator, an update period setting unit, and an adaptive algorithm processor. The channel estimator estimates a channel for a received signal. The update period setting unit sets a window corresponding to a filter coefficient update period using channel estimation information of the channel estimator. The adaptive algorithm processor acquires a filter coefficient of the set window interval and performs an equalization algorithm.

18 Claims, 4 Drawing Sheets

RECEIVE APPARATUS AND METHOD IN A MOBILE COMMUNICATION SYSTEM

PRIORITY

This application claims the benefit under 35 U.S.C. §119 (a) of a Korean Patent Application filed in the Korean Intellectual Property Office on Dec. 24, 2008 and assigned Serial No. 10-2008-0133419, the entire disclosure of which is hereby incorporated by reference.

BACKGROUND OF THE INVENTION

1. Field of the Invention

The present invention relates to an apparatus and method for improving reception performance of a mobile communication system. More particularly, the present invention relates to an apparatus and method for, when generating a statistic signal of a similar characteristic with that of an input signal of a receive apparatus and obtaining the optimal filter coefficient through an adaptive equalization algorithm, reducing a hardware size through a partial tap coefficient update.

2. Description of the Related Art

Mobile communication systems use a variety of demodulation techniques between a Base Station (BS) and a portable terminal to enable high-speed data transmission. For example, Time Division Multiple Access (TDMA) mobile communication systems (e.g., Global System for Mobile communication (GSM)/General Packet Radio Service (GPRS)/Enhanced Data rate for GSM Evolution (EDGE)) demodulate receive signals using Maximum Likelihood Sequence Detection (MLSD).

The MLSD provides excellent performance compared to other demodulation techniques, but has a problem that, due to its complexity, realization is difficult in a broadband communication system. Thus, if the MLSD cannot be applied, a linear equalizer or linear feedback equalizer is used.

The linear equalizer includes a linear filter to maximize a Signal to Interference Ratio (SIR) of a demodulation signal. However, despite providing excellent performance compared to a rake receiver, the linear equalizer has a problem in that a structure is more complex and power consumption is greater than the rake receiver. Thus, the rake receiver had been used for a portable terminal but, due to a limitation of high-speed data transmission, the linear equalizer providing excellent performance has been adopted and used.

The linear equalizer applies an adaptive equalization algorithm for determining the optimal filter coefficient using an existing signal without estimating a channel and a noise power. However, the adaptive equalization algorithm repeatedly performs a process for identifying an existing signal to identify the optimal filter coefficient and acquires the optimal filter coefficient. Thus, there occurs a problem of not being capable of acquiring the optimal filter coefficient in circumstances in which a channel state changes frequently.

That is, the above receive method can apply an algorithm for identifying the optimal filter coefficient in a static environment, but has a problem of, in a high-speed mobility environment in which a frequent channel change takes place, not being capable of applying an adaptive equalization algorithm for identifying the optimal filter coefficient.

As a method for solving the above problems, Korean patent application No. 10-2008-0057722 for Adaptive Equalization Algorithm using Statistic Signal Regeneration (SSR) was filed on 19 Jun. 2008 in the name of Samsung Electronics. In the above method using a statistic signal, a plurality of signals having the same characteristic as an input signal are regenerated using a measured channel estimation value and are used as an input of the adaptive algorithm.

The adaptive equalization algorithm is relatively less complex even at a high speed and provides the same excellent performance as Linear Minimum Mean Square Error (LMMSE) realization. However, there is a problem that, because obtaining a weight through the adaptive equalization algorithm is comparatively computationally intensive, the adaptive equalization algorithm has no choice but to have large-size hardware.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reducing a hardware size of a receive apparatus for identifying the optimal filter coefficient through an adaptive equalization algorithm in a mobile communication system.

Another aspect of the present invention is to provide an apparatus and method for, if a channel environment changes slowly and an operation time taken to obtain the optimal filter coefficient values is short, operating a partial tap coefficient update apparatus many times and, before receiving a new channel value, updating all tap coefficients, thus preventing degradation of performance in a mobile communication system.

A further aspect of the present invention is to provide an apparatus and method for, if a channel environment changes quickly and all tap coefficients cannot be updated before reception of a new channel value through a partial tap coefficient update apparatus, frequently updating a filter coefficient of a tap in which a channel estimation value has a large distribution because multi-path components converge on a main path and, in a not-so tap interval (that is, a tap interval where it is not the case that the channel estimation value has a large distribution), performing an update less frequently, thus reducing a hardware size and minimizing performance degradation in a mobile communication system.

The above aspects are achieved by providing a receive apparatus and method in a mobile communication system.

In accordance with an aspect of the present invention, a receive apparatus in a mobile communication system is provided. The apparatus includes an update period setting unit and an adaptive algorithm processor. The update period setting unit receives channel estimation information, determines a channel environment, and variably sets a filter coefficient update tap interval depending on the determined channel environment. The adaptive algorithm processor acquires a filter coefficient of the set update tap interval and performs an equalization algorithm.

In accordance with another aspect of the present invention, a receive method in a mobile communication system is provided. The method includes receiving channel estimation information and determining a channel environment, variably setting a filter coefficient update tap interval depending on the determined channel environment, and acquiring a filter coefficient of the set update tap interval and performing an equalization algorithm.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A partial tap coefficient update apparatus and method for reducing a hardware size of a receive apparatus for identifying the optimal filter coefficient through an adaptive equalization algorithm in a mobile communication system according to an exemplary embodiment of the present invention are described below.

Figure 1:
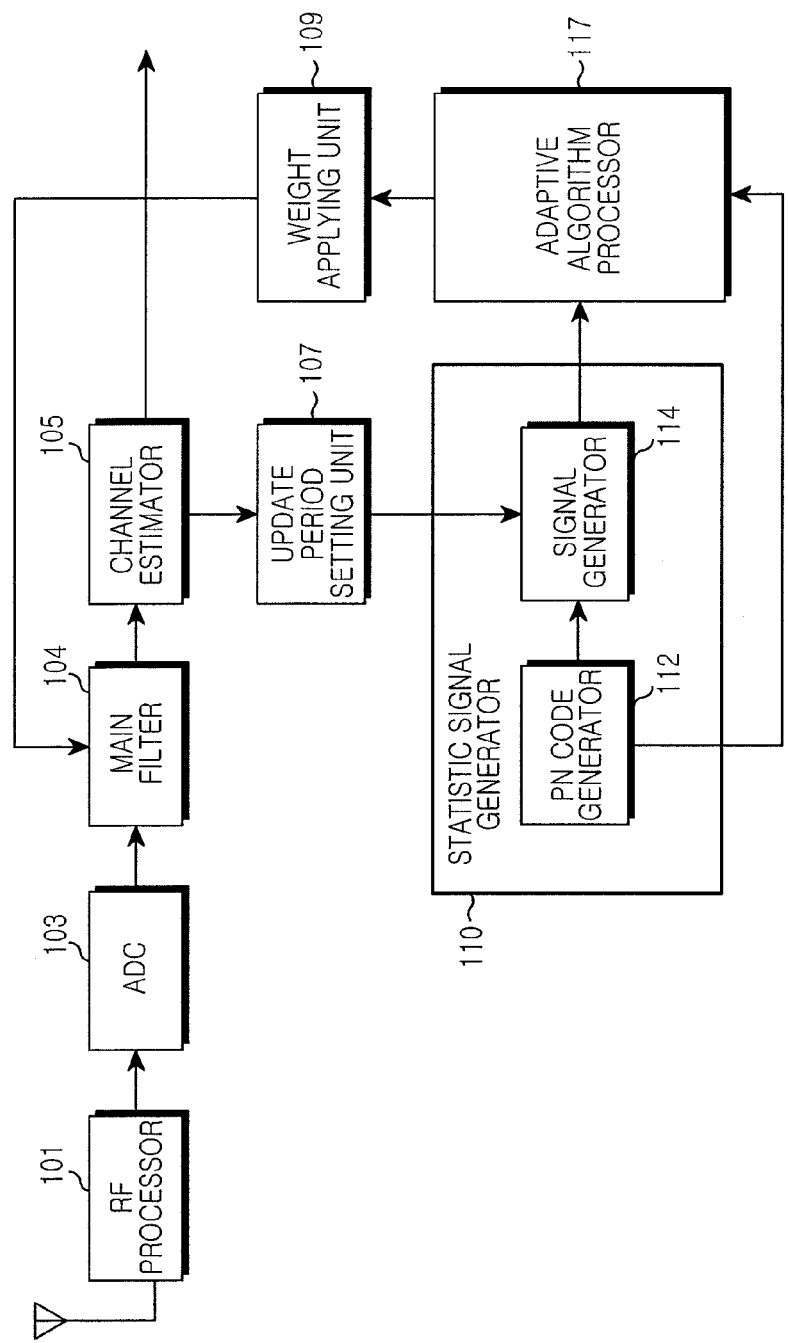
FIG. 1 is a block diagram illustrating a construction of a receive apparatus according to an exemplary embodiment of the present invention.

FIG. 1 is a block diagram illustrating a construction of a receive apparatus according to an exemplary embodiment of the present invention.

Referring to FIG. 1, the receive apparatus may include a Radio Frequency (RF) processor 101, an Analog to Digital Converter (ADC) 103, a channel estimator 105, an update period setting unit 107, a statistic signal generator 110, an adaptive algorithm processor 117, and a weight applying unit 109.

The RF processor 101 of the receive apparatus includes constituent elements such as a preprocessor, a filter, etc. The RF processor 101 converts a high frequency band signal received through an antenna of the receive apparatus into a baseband signal. The ADC 103 converts the analog baseband signal from the RF processor 101 into a digital signal.

The channel estimator 105 performs a channel estimation process for a time domain using a previously determined and stored channel estimation coefficient. After that, the channel estimation 105 performs a channel estimation process for a frequency domain and determines a channel response.

The update period setting unit 107 sets a window for acquiring a filter coefficient using the channel estimation result of the channel estimator 105. If the receive apparatus determines the channel estimation information, i.e., the channel estimation result, and determines that a channel environment changes slowly and an operation time taken to obtain the optimal filter coefficient value is short, the update period setting unit 107 sets a window of a size capable of updating all tap coefficients before receiving new channel information. That is, if it is determined that the channel environment changes slowly, the receive apparatus may operate hardware many times while moving the set window and update all tap coefficients before receiving a new channel value.

In contrast, if it is determined that the channel environment changes quickly and the receive apparatus cannot update all tap coefficients before receiving new channel information, the update period setting unit 107 may set a window to frequently update a filter coefficient of a tap in which a channel estimation value has a large distribution because multi-path components converge on a main path and, in a not-so tap interval, perform an update less frequently.

The statistic signal generator 110 generates a plurality of signals for determining the optimal filter because of a characteristic of an adaptive equalizer, using a channel response determined by the channel estimator 105. The plurality of signals generated by the statistic signal generator 110 are signals for determining the optimal filter of the adaptive equalizer, and represent signals of the same characteristic as that of an input signal. Here, the statistic signal generator 110 performs a process of generating a plurality of signals for generating many samples within a short time because, upon determining a channel characteristic in a high-speed mobility environment, the receive apparatus requires more samples than in a low-speed mobility environment.

Here, the statistic signal generator 110 of the receive apparatus may include a Pseudo Noise (PN) code generator 112 and a signal generator 114.

The PN code generator 112 of the statistic signal generator 110 processes to generate any signal for generating a plurality of statistic signals of the same characteristic as that of an input signal of the receive apparatus. At this time, the PN code generator 112 may generate a binary code signal for simplifying channel characteristic determination.

After that, the statistic signal generator 110 processes the signal generator 114 to sum up a signal generated by the PN code generator 112 and a channel determined through the channel estimation process and to generate a statistic signal of the same characteristic as that of an input signal of the receive apparatus.

The adaptive algorithm processor 117 performs an adaptive equalization algorithm using a plurality of signals generated by the statistic signal generator 110, that is, a plurality of signals having the same characteristic as an input signal of the receive apparatus, thereby acquiring the optimal filter coefficient for a received signal. Then, the adaptive algorithm processor 117 provides the acquired optimal filter coefficient to the weight applying unit 109.

The weight applying unit 109 manages filter coefficients to apply a filter coefficient received from the adaptive algorithm processor 117 to a main filter 104 of the receive apparatus.

That is, the weight applying unit 109 processes to determine a tap including a filter coefficient received from the adaptive algorithm processor 117. The filter coefficient corresponds to a window set by the update period setting unit 107. The weight applying unit 109 applies the filter coefficient to the determined tap.

Figure 2:
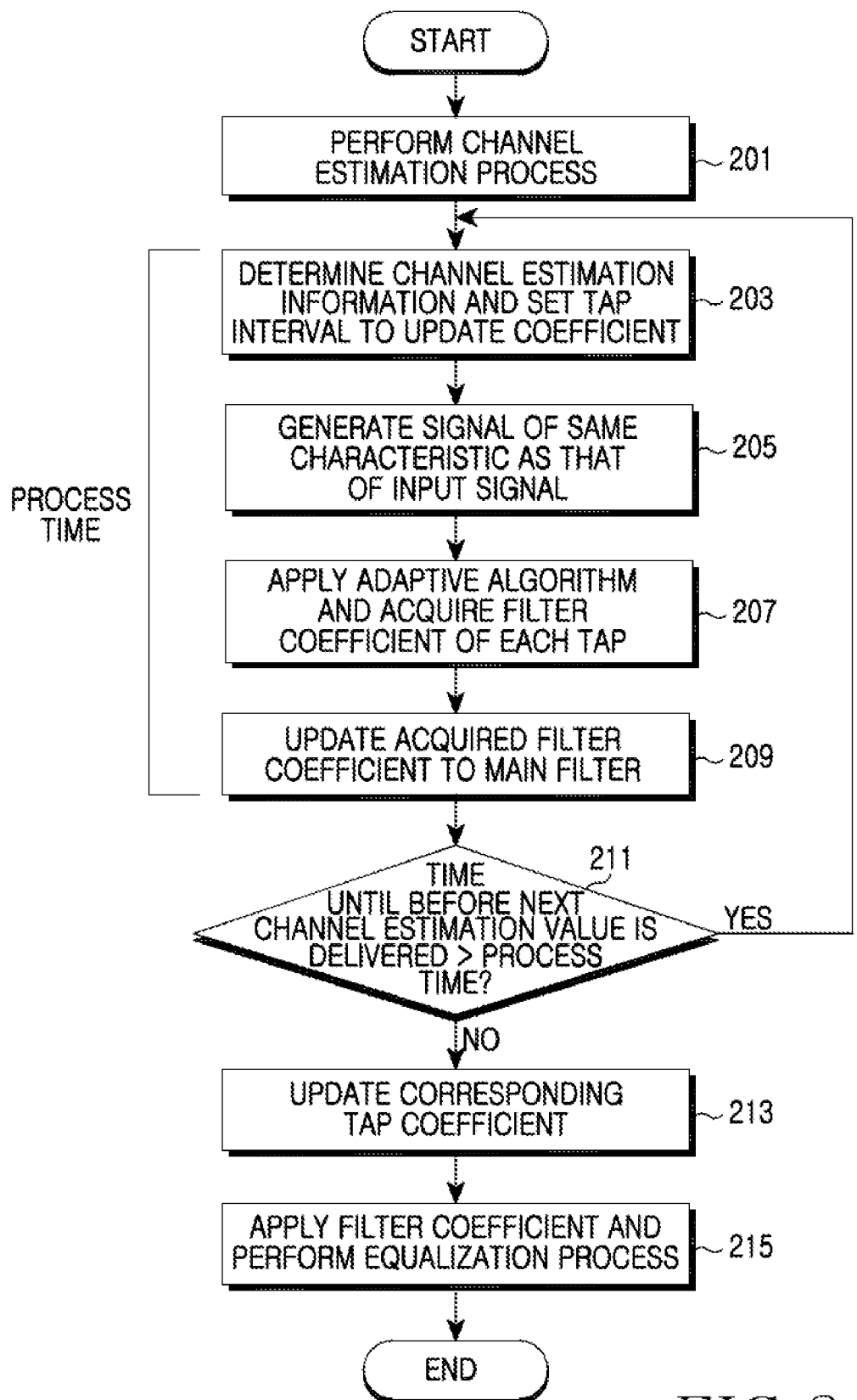
FIG. 2 is a flowchart illustrating a procedure of performing an adaptive equalization algorithm in a receive apparatus according to an exemplary embodiment of the present invention.
Figure 4:
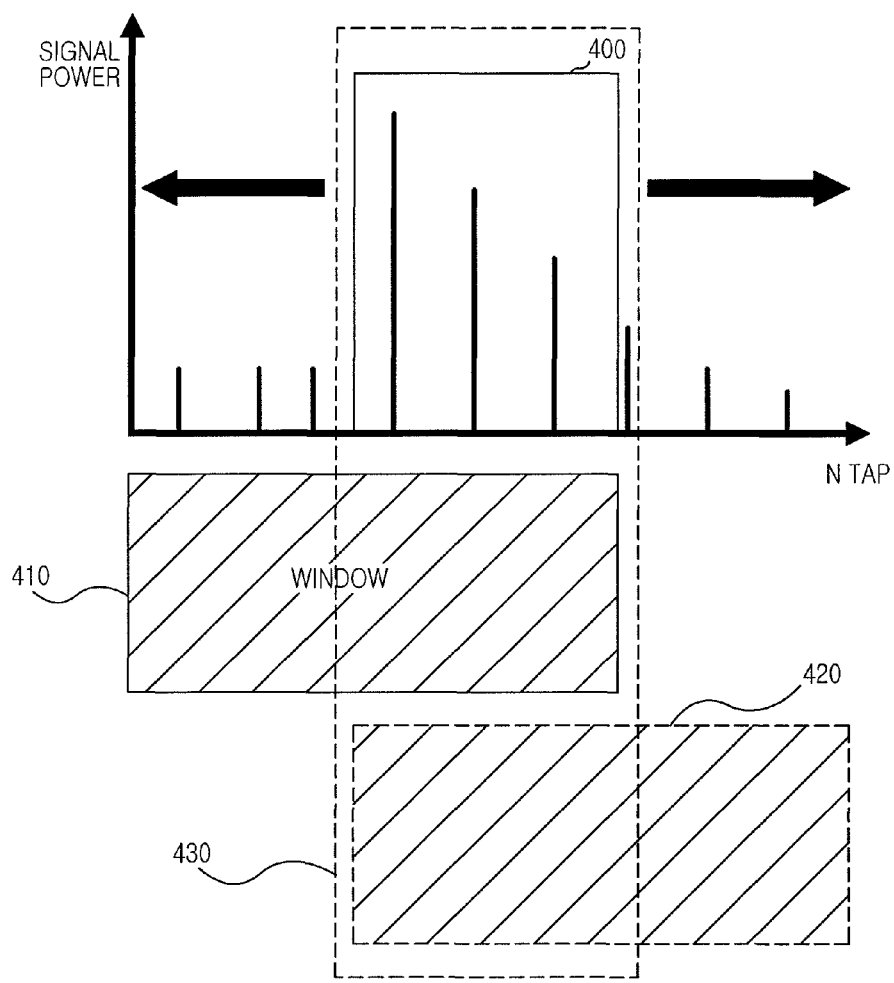
FIG. 4 is a diagram illustrating a filter coefficient update procedure of a receive apparatus according to an exemplary embodiment of the present invention.

FIG. 2 is a flowchart illustrating a procedure of performing an adaptive equalization algorithm in a receive apparatus according to an exemplary embodiment of the present invention. In the following description, FIG. 4 is a diagram illustrating a filter coefficient update procedure of the receive apparatus according to an exemplary embodiment of the present invention.

Referring to FIG. 2, in step 201, the receive apparatus performs a channel estimation process for a received signal.

Then, in step 203, the receive apparatus determines channel estimation information, and sets a tap interval, i.e., a window to update a coefficient.

Here, the window setting can be performed in either of two exemplary methods below.

A first method is a method for, if a channel environment changes slowly and an operation time taken to obtain the optimal filter coefficient value is short, setting a window to operate hardware many times while moving the window and, before receiving a new channel value, update all tap coefficients. A second method is a method for, if the channel environment changes quickly and all tap coefficients cannot be updated before receiving a new channel value, setting a new window whenever receiving the new channel value. If the channel environment changes quickly, the receive apparatus sets a window interval to frequently update a filter coefficient of a tap in which a channel estimation value has a large distribution because multi-path components converge on a main path. In a not-so tap interval, the receive apparatus sets a window interval to update less frequently.

For example, in a case that a channel environment changes quickly and before receiving a new channel value, all tap coefficients cannot be updated through a partial tap coefficient update apparatus is described below. As illustrated in FIG. 4, after determining a tap interval in which energy converges, the receive apparatus receives a first channel estimation value, sets a window 410, obtains a coefficient value, and performs an update and then, receives a second channel estimation value, sets a window 420, obtains a coefficient value, and performs an update. By doing so, the receive apparatus can perform a filter coefficient update every time in a tap interval having a high channel estimation value and, in a not-so tap interval, perform an update less frequently.

Then, the receive apparatus proceeds to step 205 and generates a plurality of signals of the same characteristic as that of an input signal using the identified channel estimation information. Here, the process of generating the plurality of signals of the same characteristic as that of the input signal is a process of generating many samples within a short time because, when determining a channel characteristic in a high-speed mobility environment, the receive apparatus requires more samples than in a low-speed mobility environment. That is, the plurality of signals are signals for determining the optimal filter because of a characteristic of an adaptive equalizer, and represent signals for determining the optimal filter of the adaptive equalizer.

In step 207, the receive apparatus applies an adaptive algorithm and acquires a filter coefficient of a window interval. At this time, the receive apparatus performs an equalization algorithm as much as a determined repetition count in a corresponding tap interval. The repetition count has a large value when a channel environment changes quickly.

The receive apparatus proceeds to step 209 and updates the coefficient value corresponding to the window interval acquired in step 207, to a weight applying unit managing coefficients for the whole tap of a main filter.

The receive apparatus proceeds to step 211 and determines whether a time till a delivery of a next channel estimation value is greater than a process time taken to perform steps 203 to 209. If it is determined that the time till the delivery of the next channel estimation value is greater than the process time taken to perform steps 203 to 209, the receive apparatus returns to step 203 and repeatedly performs a process of obtaining a coefficient of another tap. If it is determined that the time till the delivery of the next channel estimation value is not greater the process time taken to perform steps 203 to 209, the receive apparatus proceeds to step 213 and updates the coefficient obtained through the above process, to a corresponding tap.

After updating the filter coefficients corresponding to the window interval obtained through the above process, in step 215, the receive apparatus performs a process of input signal equalization and then, terminates the procedure.

Figure 3:
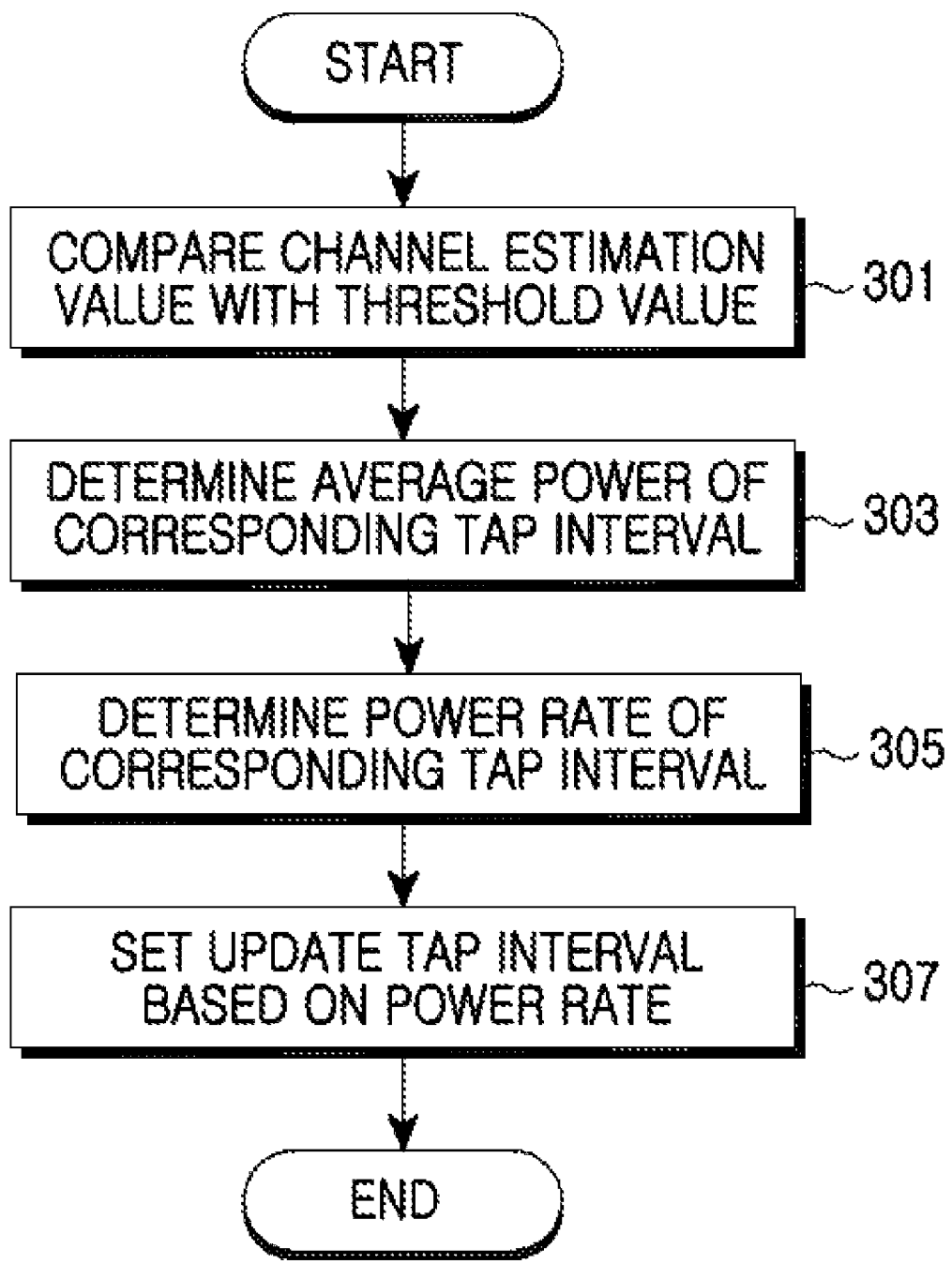
FIG. 3 is a flowchart illustrating a procedure of setting a filter coefficient update period in a receive apparatus according to an exemplary embodiment of the present invention.

FIG. 3 is a flowchart illustrating a procedure of setting a filter coefficient update period in a receive apparatus according to an exemplary embodiment of the present invention.

Referring to FIG. 3, in step 301, the receive apparatus performs a process of comparing a channel estimation value determined in a channel estimation process with a threshold value.

Here, if the channel estimation value is less than the threshold value, the receive apparatus determines that the channel estimation value is not equal to a real signal value but is equal to a noise component value, and disregards the channel estimation value.

In step 303, the receive apparatus determines an average power of a corresponding tap interval and, in step 305, processes to determine a power rate of the corresponding tap interval.

The receive apparatus proceeds to step 307 and sets an update tap interval using the power rate determined in step 305.

That is, the receive apparatus has to change a window to update coefficients of all taps until before a next channel estimation value is delivered if a channel environment changes slowly, that is, if performance is satisfactory despite the receive apparatus obtaining a coefficient value by applying an equalization algorithm less frequently. On the contrary, the receive apparatus applies a different coefficient update count by tap if the channel environment changes quickly and it is required to apply an equalization algorithm of many counts to obtain a tap coefficient. In more detail, the receive apparatus adjusts a window such that, because a tap interval of a high power rate is a tap interval in which multi-path components converge on a main path, the tap interval is updated more frequently, and a tap interval of a low power rate is updated less.

Then, the receive apparatus terminates the procedure.

That is, the receive apparatus using the above adaptive equalization algorithm may acquire the optimal filter coefficient in a high-speed mobility environment, by generating a plurality of signals having the same characteristic as an input signal in order to determine a channel characteristic in the high-speed mobility environment.

FIG. 4 is a diagram illustrating a filter coefficient update procedure of a receive apparatus according to an exemplary embodiment of the present invention.

Referring to FIG. 4, after performing a channel estimation process, the receive apparatus sets a filter coefficient update period using the channel estimation result. Here, the receive apparatus compares the channel estimation information with a threshold value, determines whether energy exists, and as illustrated in FIG. 4, sets a window for acquiring a filter coefficient.

At this time, as illustrated in FIG. 4, the receive apparatus sets a window 410 for frequently performing filter coefficient update for a tap interval 400 in which energy converges, and primarily acquires a filter coefficient for the tap interval 400 using the set window. After that, the receive apparatus moves the window 420 to a next tap interval and secondarily acquires a filter coefficient for the next tap interval.

In conclusion, as illustrated in FIG. 4, the receive apparatus processes to acquire two filter coefficients 430, one from window 410 and one from window 420, for a tap interval 400 in which energy converges, and acquire one filter coefficient for a tap interval in which energy does not converge.

Unlike a conventional scheme for obtaining the whole tap coefficient, the receive apparatus performing the above process to partially obtain a tap coefficient, thereby being capable of reducing a hardware size. Compared to a case of receiving a channel estimation value and updating all taps every time, the receive apparatus has no choice but to suffer performance degradation. However, the performance degradation may be minimized by performing a frequent filter coefficient update for a tap interval in which multi-path components converge on a main path, i.e., a tap interval of a high channel estimation value and performing an update less frequently for a not-so tap interval.

For example, suppose the receive apparatus realizes an equalizer including a total of 40 taps. Unlike a conventional method of realizing hardware for obtaining coefficients of 40 taps through statistic signal generation for obtaining 40 taps, an exemplary embodiment of the present invention realizes hardware capable of obtaining coefficients of 30 taps.

At this time, as determining that energy converges on 10th to 30th taps, the receive apparatus may set a window such that coefficients of the taps are updated more frequently.

For instance, if the receive apparatus receives a first channel estimation value, sets a window 410, and obtains a first coefficient value and then, receives a second channel estimation value, sets the window 420, and obtains a second coefficient value, it is possible to always update the 10th to 30th taps in which multi-path components converge on a main path.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

As described above, when generating a statistic signal of a similar characteristic with that of an input signal of a receive apparatus and determining the optimal filter coefficient through an adaptive equalization algorithm, an exemplary embodiment of the present invention is to partially update a tap coefficient and reduce a hardware size. In an exemplary embodiment of the present invention, if a channel environment changes slowly and an operation time taken to obtain the optimal filter coefficient value is short, a partial tap coefficient update apparatus is operated many times and all tap coefficients are updated before receiving a new channel value, thus preventing performance degradation. If the channel environment changes quickly, a filter coefficient of a tap in which a channel estimation value has a large distribution because multi-path components converge on a main path can be updated frequently. By doing so, the exemplary embodiment of the present invention can provide a solution to a problem of having no choice but to have a large size hardware as performing operations of many counts when obtaining a weight through an adaptive algorithm.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A receive apparatus in a mobile communication system, the apparatus comprising:
    an update period setting unit for receiving channel estimation information, for determining a channel environment based on the received channel estimation information, and for setting a filter coefficient update tap interval depending on the determined channel environment; and
    an adaptive algorithm processor for acquiring a filter coefficient of the set update tap interval and for performing an equalization algorithm.

2. The apparatus of claim 1, wherein, if a slow change of the channel environment using the channel estimation information is determined, the update period setting unit sets a filter coefficient update tap interval to perform a partial update for the whole tap.

3. The apparatus of claim 2, wherein the update period setting unit slices the whole tap interval into a plurality of filter coefficient update tap intervals to update a filter coefficient of the whole tap interval until reception of new channel information, and successively updates filter coefficients for the sliced tap intervals.

4. The apparatus of claim 1, wherein, if a quick change of the channel environment using the channel estimation information is determined, the update period setting unit sets a filter coefficient update tap interval corresponding to a multi-path tap interval.

5. The apparatus of claim 4, wherein, when the channel estimation information is received, the update period setting unit sets the filter coefficient update tap interval comprising the multi-path tap interval and acquires a filter coefficient and, even when new channel estimation information is received, sets a filter coefficient update tap interval overlappingly comprising the multi-path tap interval and acquires a filter coefficient.

6. The apparatus of claim 1, wherein the update period setting unit determines a tap interval in which a real signal exists using the channel information, and determines the channel environment on the basis of how quickly or slowly a power rate changes based on an average power of the determined tap interval.

7. The apparatus of claim 1, wherein the adaptive algorithm processor acquires the filter coefficient of the set filter coefficient update tap interval by generating a plurality of signals of the same characteristic as that of an input signal.

8. The apparatus of claim 1, wherein, after the filter coefficient of the set update tap interval is acquired, the apparatus applies the acquired filter coefficient of the tap interval to a tap interval of a main filter.

9. The apparatus of claim 1, further comprising:
a weight applying unit for managing filter coefficients to apply a filter coefficient received from the adaptive algorithm processor to a main filter,
wherein, the weight applying unit determines a tap including the filter coefficient received from the adaptive algorithm processor.

10. A receive method in a mobile communication system, the method comprising:
receiving channel estimation information and determining a channel environment based on the received channel estimation information;
setting a filter coefficient update tap interval depending on the determined channel environment; and
acquiring a filter coefficient of the set update tap interval and performing an equalization algorithm.

11. The method of claim 10, wherein the variably setting of the filter coefficient update tap interval further comprises, if a slow change of the channel environment using the channel estimation information is determined, setting a filter coefficient update tap interval making it possible to perform partial update for the whole tap.

12. The method of claim 11, wherein the setting of the filter coefficient update tap interval to perform the partial update for the whole tap further comprises:
slicing the whole tap interval into a plurality of filter coefficient update tap intervals to update a filter coefficient for the whole tap interval until reception of new channel information; and
successively updating filter coefficients for the sliced tap intervals.

13. The method of claim 10, wherein the variably setting of the filter coefficient update tap interval depending on the determined channel environment further comprises, if a quick change of the channel environment using the channel estimation information is determined, setting a filter coefficient update tap interval corresponding to a multi-path tap interval.

14. The method of claim 13, wherein the setting of the filter coefficient update tap interval aiming at the multi-path tap interval further comprises:
when the channel estimation information is received, setting the filter coefficient update tap interval comprising the multi-path tap interval, and acquiring a filter coefficient; and
even when new channel estimation information is received, setting a filter coefficient update tap interval overlappingly comprising the multi-path tap interval, and acquiring a filter coefficient.

15. The method of claim 10, wherein the receiving of the channel estimation information on a receive signal and the determining of the channel environment further comprises:
determining a tap interval in which a real signal exists using the channel information; and
determining the channel environment on the basis of how quickly or slowly a power rate changes based on an average power of the tap interval.

16. The method of claim 10, wherein the filter coefficient of the set filter coefficient update tap interval is acquired by generating a plurality of signals of the same characteristic as that of an input signal.

17. The method of claim 10, further comprising, after the acquiring of the filter coefficient of the set update tap interval, applying the acquired filter coefficient of the tap interval to a tap interval of a main filter.

18. The method of claim 10, further comprising:
managing, by a weight applying unit, filter coefficients to apply a filter coefficient received from an adaptive algorithm processor to a main filter,
wherein, the weight applying unit determines a tap including the filter coefficient received from the adaptive algorithm processor.

* * * * *